United States Patent
Guckel et al.

(10) Patent No.: US 6,186,577 B1
(45) Date of Patent: Feb. 13, 2001

(54) CONVERTIBLE

(75) Inventors: Martin Guckel, Neuhausen; Peer-Olaf Kober, Sindelfingen, both of (DE)

(73) Assignee: DaimlerChrysler AG, Stuttgart (DE)

( * ) Notice: Under 35 U.S.C. 154(b), the term of this patent shall be extended for 0 days.

(21) Appl. No.: 09/238,139

(22) Filed: Jan. 28, 1999

(30) Foreign Application Priority Data

Jan. 28, 1998 (DE) ............................................. 198 03 155

(51) Int. Cl.$^7$ ....................................................... B60J 7/00
(52) U.S. Cl. .............................. 296/107.07; 296/107.08; 296/76; 296/136
(58) Field of Search ...................... 296/107.08, 107.07, 296/76, 136

(56) References Cited

U.S. PATENT DOCUMENTS

| | | | |
|---|---|---|---|
| 5,033,789 | * 7/1991 | Hayshi et al. | 296/107.08 |
| 5,267,769 | * 12/1993 | Bonne et al. | 296/107.08 |
| 5,295,722 | * 3/1994 | Bonne et al. | 296/107.08 |
| 5,533,777 | * 7/1996 | Kleemann et al. | 296/107.08 |
| 5,558,389 | * 9/1996 | Rothe et al. | 296/107.08 |
| 5,620,226 | * 4/1997 | Sautter et al. | 296/107.08 |
| 5,654,615 | * 8/1997 | Brodsky | 296/107.08 |
| 5,769,483 | * 6/1998 | Danzl et al. | 296/107.08 |
| 5,823,606 | * 10/1998 | Schenk et al. | 296/107.08 |
| 5,864,214 | * 1/1999 | Brodsky | 296/107.08 |
| 5,975,619 | * 11/1999 | Dettling et al. | 296/107.08 |
| 6,010,178 | * 1/2000 | Hahn et al. | 296/107.08 |
| 6,019,416 | * 2/2000 | Beierl | 296/107.08 |

FOREIGN PATENT DOCUMENTS

| | | |
|---|---|---|
| 4445580 | 12/1995 | (DE) . |
| 4445944 | 4/1996 | (DE) . |
| 19516877 | 10/1996 | (DE) . |
| 0277295 | 8/1988 | (EP) . |
| 2 301 069 | 11/1996 | (GB) . |

\* cited by examiner

Primary Examiner—Joseph D. Pape
Assistant Examiner—Kiran Patel
(74) Attorney, Agent, or Firm—Evenson, McKeown, Edwards & Lenahan, P.L.L.C.

(57) ABSTRACT

A convertible is provided with a roof construction which has at least one roof part and a rear window part. The construction can be at least partially deposited in a trunk space in an opening position in the rear area of the vehicle under a rear opening hood. To provide an opening which exposes the trunk space toward the rear, the rear opening hood is laterally linked, in each case by a guiding linkage, along a first forward swivelling axis to a lateral auxiliary frame. Two lateral auxiliary frames are supported on the vehicle body side in the lower rear area of the vehicle behind the first swivelling axis, in each case, by an additional control arm which, by way of a point of rotation, is connected with the pertaining auxiliary frame. At least one of the two auxiliary frames can be connected by way of a releasable locking element with the motor vehicle body. In the rear area, the rear opening hood is connected by a second rearward swivelling axis with the vehicle body for depositing the roof construction. The second swivelling axis is provided with a locking device for the rear opening hood. This locking device can be released for providing an opening which exposes the trunk space toward the rear.

20 Claims, 2 Drawing Sheets

US 6,186,577 B1

CONVERTIBLE

This application claims the priority of German patent application No. 198 03 155.6, filed Jan. 28, 1998, the disclosure of which is expressly incorporated by reference herein.

BACKGROUND AND SUMMARY OF THE INVENTION

This invention relates to a convertible having a roof construction which comprises at least one roof part and a rear window part and which can be deposited into an opening position in a rear area of the vehicle under a rear opening hood.

German Patent Document DE 44 45 944 discloses a convertible having a rear opening hood which is linked by a first swivelling axis to an auxiliary frame which, in turn, is supported by way of a swivelling axis on the vehicle body side in the lower vehicle end area. During movement about this swivelling axis, the rear opening hood can be brought into a first opening position which opens up the trunk space toward the rear. During movement about a second swivelling axis together with the auxiliary frame, the rear opening hood is swivelled about the second rearward swivelling axis, toward the rear and upwards, and thus exposes an opening position for depositing the roof construction. The two lateral auxiliary frame parts are connected with one another in the rearward area of the vehicle by way of a supporting tube extending transversely to the driving direction. The supporting tube is supported on the vehicle body side by way of a hinge and synchronizes the two lateral auxiliary frame parts. The rear opening hood is arranged on the supporting tube.

In this construction, it is a disadvantage that a relatively large amount of space is required for the parts which are needed to provide movement of the rear opening hood. This space is unavailable, therefore, for use as trunk space, for example.

German Patent Document DE 195 16 877 relates to a convertible in which an auxiliary frame is provided on the rear opening hood of the vehicle and can be moved about swivel bearings fixed to the vehicle body. When the rear opening hood is closed, this hood is supported about at least one additional supporting connection on the vehicle body.

This convertible has the disadvantage that a relatively large amount of space is also required for the mechanism and, furthermore, the utilization of the trunk space volume is disadvantageous.

Concerning additional general prior art, reference is also made to European Patent Document EP 0 277 295 and German Patent Document DE 44 45 580 C1.

The present invention has as its object the provision of a convertible in which, on the one hand, the trunk space volume is easily accessible and, on the other hand, in which the parts necessary for operating the roof construction do not require an excessive amount of space.

According to the invention, this object is achieved by particularly claimed characteristics.

According to the invention, a frame part or supporting tube, which typically extends transversely to the vehicle and requires a corresponding mounting space, is eliminated. Instead of such a frame part, the rear opening hood is used as an active element in the kinematics such that it provides a synchronism of the two lateral auxiliary frames. An additional control arm is only required on each side for this purpose. This additional control arm is connected with the pertaining auxiliary frame by way of a pivot. However, the additional control arm can be arranged in a space-saving manner laterally in the vehicle.

A very advantageous further development is obtained if the lateral auxiliary frames are divided into two partial arms which are, in each case, connected with one another by an axis of rotation. The longitudinal axis of the additional control arm is inclined from its vehicle-body-side supporting point diagonally inside and upwards.

As a result of the division of the lateral auxiliary frames into two partial arms and the diagonal arrangement of the additional control arm, the loading width in the trunk space can be increased in the rear and a more pleasing shape of the rear of the vehicle can be achieved. In the auxiliary frame construction according to the prior art, it is disadvantageous that the joint located laterally between the rear opening hood and the side part has to be situated relatively far to the outside. As a result of the construction according to the invention, the rear part can now be pulled in the rear area, or the joint between the rear opening hood and the side part can be displaced farther toward the inside. This is because the kinematics in the lateral area are not arranged in parallel to the network, as is customary, but in parallel to the joint. During the opening movement of the rear opening hood with the auxiliary frame for depositing the roof construction, the axis of rotation between the two partial arms can be swivelled toward the outside beyond the joint.

BRIEF DESCRIPTION OF THE DRAWINGS

Advantages and further developments of the invention will become clear from the following description of the embodiment shown in the drawings with respect to its principle.

DESCRIPTION OF THE PREFERRED EMBODIMENTS

Figure 1:
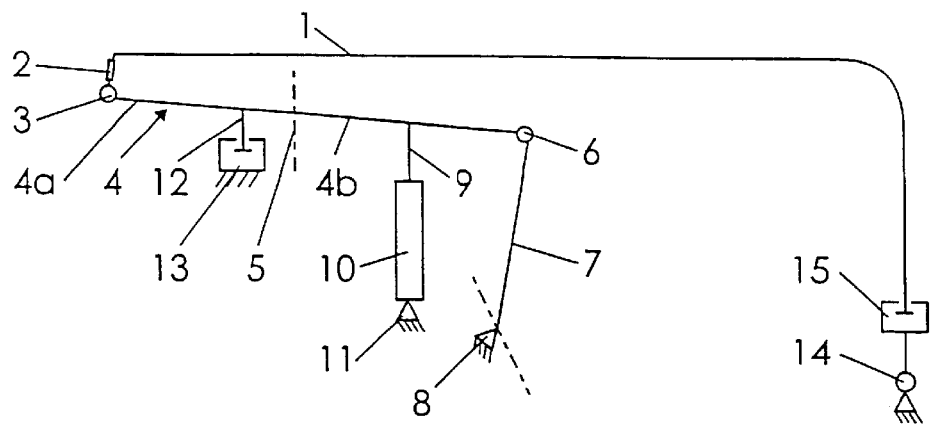
FIG. 1 is a simplified representation of the kinematics of rear opening hood movement for depositing the roof construction of a convertible and for opening the trunk.

A rear opening hood 1 is in each case linked laterally by way of a guiding linkage 2 by a first forward swivelling axis 3 to a lateral auxiliary frame 4. The two lateral auxiliary frames 4 are each divided into two partial arms 4a and 4b which are in each case connected with one another by an axis of rotation 5.

At the end of the partial arm 4b facing away from the axis of rotation 5, this partial arm 4b is connected by way of a spherical head 6 as a point of rotation with one end of an additional control arm 7 in a articulated manner. The other end of the additional control arm 7 is also linked in an articulated manner to a vehicle-body-side supporting point 8. The longitudinal axis of the additional control arm 7 extends from its vehicle-body-side supporting point 8 inclined diagonally to the inside upward to the spherical head 6. A piston rod 9 of an operating cylinder 10 is applied to the partial arm 4b of the auxiliary frame 4, which operating cylinder 10 is supported by its end facing away from the partial arm 4b by way of a hinge on a supporting point 11 fixed on the vehicle body side.

A locking element 12 is arranged on the partial arm 4a, which is situated between the axis of rotation 5 and the swivelling axis 3. The locking element 12 cooperates with a locking member 13 arranged on the vehicle body side.

In the rear area, the hood 1 is connected by way of a second rearward swivelling axis 14 with the vehicle body. The second swivelling axis 14 is provided with a locking device 15 which can be released to provide an opening which exposes the trunk toward the rear, so that the rear opening hood 1 can be correspondingly swivelled in the upward direction. Since the construction of such a locking device 15 is known, it will not be described in detail in the following.

Figure 3:
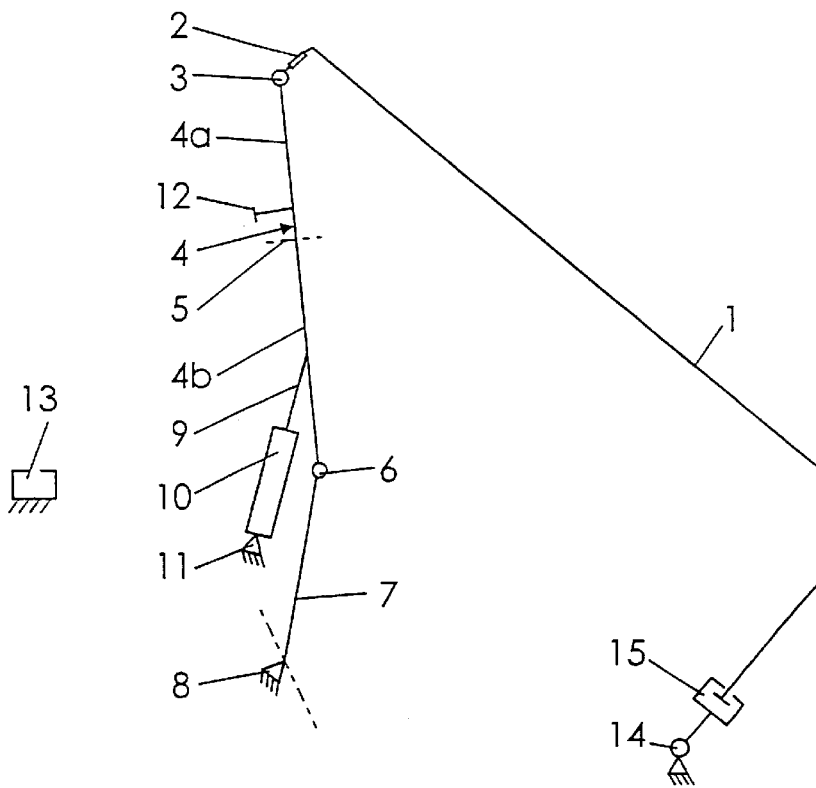
FIG. 3 is a view of the kinematics according to FIG. 1 with an opened rear opening hood for depositing the roof construction.
Figure 4:
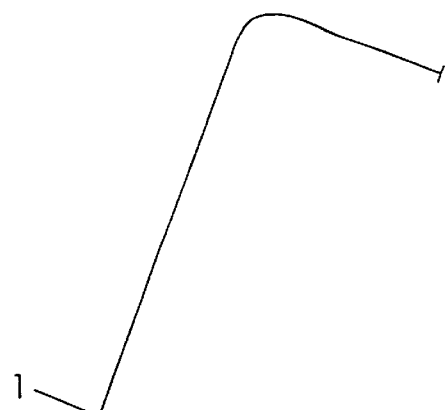
FIG. 4 is a view of the kinematics according to FIG. 1 with an opened rear opening hood and an opening exposing the trunk toward the rear.
Figure 5:
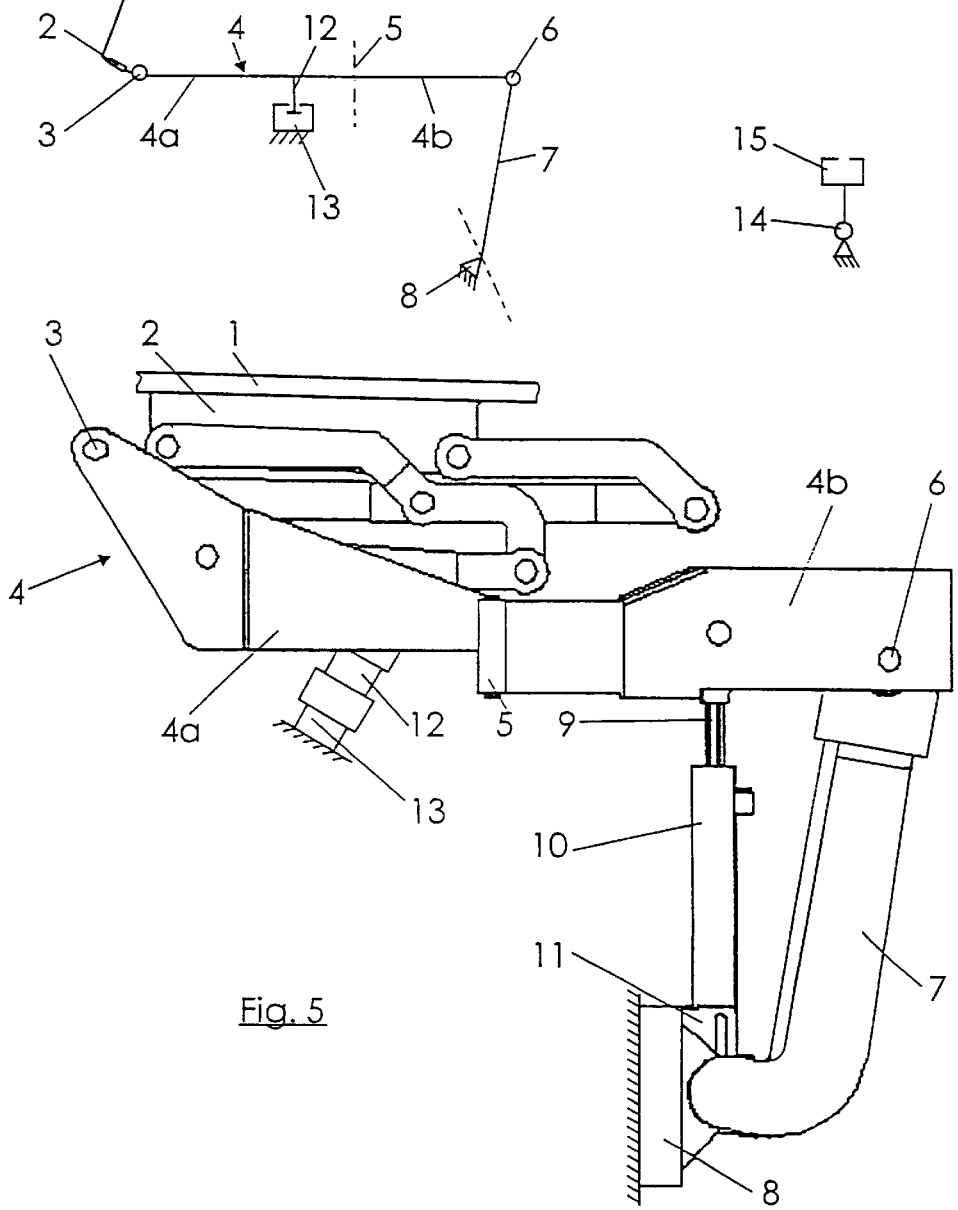
FIG. 5 is a lateral view of an enlarged representation of the guiding linkage with the auxiliary frame and the additional control arm in the area of the first forward swivelling axis.

FIGS. 3 and 4 show the kinematics or the movement of the rear opening hood 1. FIG. 3 shows the position of the rear opening hood 1 in which the locking member 13 has been released by the locking member 12 and in which the piston rod 9 of the operating cylinder 10 swivels the forward swivelling axis 3 together with the guiding linkage 2 and the auxiliary frame 4 upwards and to the rear so that a receiving opening is exposed for a roof construction to be deposited in the rear area of the convertible. Since the construction and the depositing kinematics for a roof construction, which generally consists of a roof part and a rear window part, is generally known and is not important for the kinematics of the rear opening hood 1, they are not shown for reasons of simplification.

As is also illustrated in FIG. 3, the rear opening hood 1 swivels in this case about the rearward swivelling axis 14, the locking 15 between the rear opening hood 1 and the swivelling axis 14 being closed in this case.

FIG. 4 shows the position of the rear opening hood 1 which it takes up when, for loading from the rear, the rear opening hood is swivelled upwards about the forward swivelling axis 3. As illustrated, in this case, the locking in the locking device 15 is released and the locking member 12 is positioned by the locking member 13 and thus the auxiliary frame 4.

Figure 2:
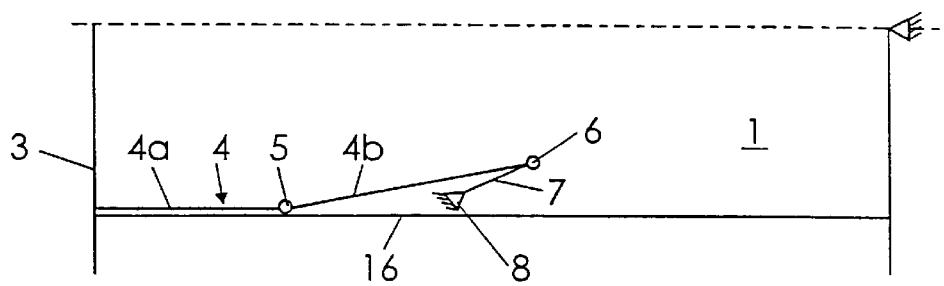
FIG. 2 is a semisectional top view of the kinematics according to FIG. 1.

FIGS. 1 to 3 do not show the guiding linkage 2 in detail. It may basically be of any construction. However, because of the vehicle contour in this area, it will generally be constructed as a multiple joint in order to achieve a simultaneous lifting movement of the rear opening hood 1 during swivelling. In a possible embodiment, FIG. 4 more clearly shows the construction of the guiding linkage 2 with the auxiliary frame 4 and the parts applied to it.

As illustrated in FIGS. 1 and 2, by the division of the two lateral auxiliary frames 4 into the partial arms 4a and 4b and the diagonal arrangement of the additional control arms 7 according to the invention, certain kinematics can be achieved in parallel to a joint between the rear opening hood 1 and a vehicle side wall 16 (illustrated only in FIG. 2). In this manner, during an opening movement of the rear opening hood with the auxiliary frame 4 for depositing the roof construction, according to FIG. 3, the axis of rotation 5 between the two partial arms can be moved toward the outside beyond the joint. As a result of this measure, the above-mentioned parts can be arranged also in the vehicle itself very far laterally to the outside so that less trunk volume is lost.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. Convertible, having a roof construction which includes at least one roof part and a rear window part and which can be deposited in an open position in a rear area of the convertible under a rear opening hood at least partially in a trunk space, comprising:

a) a guiding linkage which laterally links the rear opening hood in each case by a first forward swivelling axis to two lateral auxiliary frames for an opening exposing be truck space rearwardly, b) a non-hydraulic control arm by which the two lateral auxiliary frames are supported on a vehicle body side in a lower rear area of the convertible behind the first forward swivelling axis in each case, each control arm being connected by way of a point of rotation with one of the lateral auxiliary frames, c) a releasable locking member by which at least one of the two auxiliary frames can be connected with the body of the convertible, d) a second rearward swivelling axis by which the rear opening hood is connected in the rear area for depositing the roof construction with the convertible body, and e) a locking device for the rear opening hood which can be released to provide an opening which rearwardly exposes the trunk space provided to the second swivelling axis.

2. Convertible, having a roof construction which includes at least one roof part and a rear window part and which can be deposited in an open position in a rear area of the convertible under a rear opening hood at least partially in a trunk space, comprising:

a) a guiding linkage which laterally links the rear opening hood in each case by a first forward swivelling axis to two lateral auxiliary frames for an opening exposing the truck space rearwardly, b) an additional control arm by which the two lateral auxiliary frames are supported on a vehicle body side in a lower rear area of the convertible behind the first forward swivelling axis in each case, each additional control arm being connected by way of a point of rotation with one of the lateral auxiliary frames, c) a releasable locking member by which at least one of the two auxiliary frames can be connected with the body of the convertible, d) a second rearward swivelling axis by which the rear opening hood is connected in the rear area for depositing the roof construction with the convertible body, and e) a locking device for the rear opening hood which can be released to provide an opening which rearwardly exposes the trunk space provided to the second swivelling axis, wherein each of the lateral auxiliary frames is divided into two partial arms connected with one another by an axis of rotation, a longitudinal axis of the additional control arm being inclined from a convertible-body-side supporting point diagonally toward the inside and upwards.

3. Convertible according to claim 2, wherein the point of rotation between each lateral auxiliary frame and the additional control arm is formed by a spherical head.

4. Convertible according to claim 2, wherein the releasable locking member is arranged on one of the partial arms which is connected with the first forward swivelling axis and the guiding linkage.

5. Convertible according to claim 2, and further comprising an operating cylinder with a piston rod linked to one of the two partial arms of the lateral auxiliary frame which is arranged between the first forward swivelling axis and the point of rotation.

6. Convertible according to claim 3, wherein the releasable locking member is arranged on one of the partial arms which is connected with the first forward swivelling axis and the guiding linkage.

7. Convertible according to claim 3, and further comprising an operating cylinder with a piston rod linked to one of the two partial arms of the lateral auxiliary frame which is arranged between the first forward swivelling axis and the point of rotation.

8. Convertible according to claim 4, and further comprising an operating cylinder with a piston rod linked to one of the two partial arms of the lateral auxiliary frame which is arranged between the first forward swivelling axis and the point of rotation.

9. Convertible having a roof construction which can be deposited under a rear opening hood at least partially in a trunk space, comprising:
- a rear opening hood laterally linked along a first swivelling axis to lateral auxiliary frames,
- non-hydraulic control arms connected at first ends to the lateral auxiliary frames by points of rotation and at second ends to sides of a body of the convertible,
- a first releasable locking member connecting at least one of the two auxiliary frames with the body of the convertible, and
- a second releasable locking member connecting the rear opening hood with the body of the convertible along a second swivelling axis,
- wherein the rear opening hood pivots around the first swivelling axis to rearwardly expose the trunk space and around the second swivelling axis so that the roof construction can be deposited under the rear opening hood.

10. Convertible according to claim 9, and further comprising guiding linkages interconnecting said rear opening hood and said lateral auxiliary frames.

11. Convertible having a roof construction which can be deposited under a rear opening hood at least partially in a trunk space, comprising:
- a rear opening hood laterally linked along a first swivelling axis to lateral auxiliary frames,
- control arms connected at first ends to the lateral auxiliary frames by points of rotation and at second ends to sides of a body of the convertible,
- a first releasable locking member connecting at least one of the two auxiliary frames with the body of the convertible, and
- a second releasable locking member connecting the rear opening hood with the body of the convertible along a second swivelling axis,
- wherein the rear opening hood pivots around the first swivelling axis to rearwardly expose the trunk space and around the second swivelling axis so that the roof construction can be deposited under the rear opening hood,
- wherein each of the lateral auxiliary frames is divided into two partial arms connected with one another along an axis of rotation.

12. Convertible according to claim 11, wherein the control arms connected to the lateral auxiliary frames and the body of the convertible are inclined diagonally inwardly toward one another and upwards.

13. Convertible according to claim 12, wherein each of the control arms is rotatably connected to one of said partial arms by a spherical head.

14. Convertible according to claim 11, wherein the first releasable locking member is arranged on one of the partial arms which is connected between the first swivelling axis and the axis of rotation.

15. Convertible according to claim 11, and further comprising an operating cylinder with a piston rod linked to one of the two partial arms of each lateral auxiliary frame which is arranged between the first swivelling axis and one of the points of rotation.

16. Convertible according to claim 12, wherein the first releasable locking member is arranged on one of the partial arms which is connected between the first swivelling axis and the axis of rotation.

17. Convertible according to claim 13, wherein the first releasable locking member is arranged on the other of the partial arms which is connected between the first swivelling axis and the axis of rotation.

18. Convertible according to claim 12, and further comprising an operating cylinder with a piston rod linked to one of the two partial arms of each lateral auxiliary frame which is arranged between the first swivelling axis and one of the points of rotation.

19. Convertible according to claim 13, and further comprising an operating cylinder with a piston rod linked to said one of the two partial arms of each lateral auxiliary frame which is arranged between the first swivelling axis and one of the points of rotation.

20. Convertible according to claim 14, and further comprising an operating cylinder with a piston rod linked to the other of the two partial arms.

* * * * *